(12) United States Patent
Lin

(10) Patent No.: US 7,077,923 B2
(45) Date of Patent: Jul. 18, 2006

(54) METHOD FOR MANUFACTURING AN AIR PERMEABLE COMPOSITE FILM

(76) Inventor: Irene Lin, No. 71, Ln. 53, Kuang-Hwa Rd., Shan-Hwa Town, Tainan Hsien (TW)

( * ) Notice: Subject to any disclaimer, the term of this patent is extended or adjusted under 35 U.S.C. 154(b) by 191 days.

(21) Appl. No.: 10/605,611

(22) Filed: Oct. 14, 2003

(65) Prior Publication Data

US 2004/0103989 A1    Jun. 3, 2004

Related U.S. Application Data

(62) Division of application No. 09/584,701, filed on Jun. 1, 2000, now abandoned.

(51) Int. Cl.
  *B32B 3/10*    (2006.01)
(52) U.S. Cl. .......... 156/87; 156/252; 156/253; 156/292; 156/308.4; 428/136; 428/138; 426/118
(58) Field of Classification Search ............. 426/118; 215/307; 229/120; 220/203.17; 156/87
  See application file for complete search history.

(56) References Cited

U.S. PATENT DOCUMENTS

| | | |
|---|---|---|
| 3,310,505 A | 3/1967 | Parker |
| 3,378,507 A | 4/1968 | Sargent et al. |
| 3,607,793 A | 9/1971 | Mahlman |
| 3,672,916 A | 6/1972 | Virnig |
| 3,812,224 A | 5/1974 | Smith et al. |
| 4,247,498 A | 1/1981 | Castro |
| 4,350,655 A | 9/1982 | Hoge |
| 4,404,241 A | 9/1983 | Mueller et al. |
| 4,466,931 A | 8/1984 | Tanny |
| 4,657,610 A * | 4/1987 | Komatsu et al. ............. 156/87 |
| 4,689,936 A | 9/1987 | Gaikema et al. |
| 4,769,175 A | 9/1988 | Inoue |
| 4,986,673 A * | 1/1991 | Bell ........................ 383/204 |
| 5,012,061 A | 4/1991 | Lesser |
| 5,141,795 A * | 8/1992 | Kai et al. ................. 428/138 |
| 5,257,475 A | 11/1993 | Tanimura |
| 5,362,500 A | 11/1994 | Mazurek et al. |
| 5,458,951 A * | 10/1995 | Kagawa ................... 428/155 |
| 5,672,406 A | 9/1997 | Challis et al. |
| 5,811,027 A * | 9/1998 | Speer et al. .......... 252/188.28 |
| 5,865,926 A | 2/1999 | Wu et al. |
| 5,928,582 A | 7/1999 | Kenigsberg |
| 6,068,898 A | 5/2000 | Oyama |

FOREIGN PATENT DOCUMENTS

JP    11079260    3/1999

* cited by examiner

*Primary Examiner*—Sam Chuan Yao
*Assistant Examiner*—Barbara J Musser
(74) *Attorney, Agent, or Firm*—Andrus, Sceales, Stark & Sawall, LLP

(57) ABSTRACT

A method for manufacturing a novel air permeable composite film is disclosed. The air permeable composite film has a polymer layer with a top face and a bottom face and a sealing layer covering the top face. The polymer layer is first perforated by virtue of an impression process to form a plurality of tiny gaps in it for air permeation. Then the sealing layer is coated on the top face of the polymer layer to fill the gaps. The differential pressure between the top face and bottom face of the polymer layer enlarges the gaps and makes the gaps become air permeable.

10 Claims, 6 Drawing Sheets

METHOD FOR MANUFACTURING AN AIR PERMEABLE COMPOSITE FILM

CROSS REFERENCE TO RELATED APPLICATIONS

This application is a divisional of U.S. patent application Ser. No. 09/584,701 filed Jun. 1, 2000 now abandoned.

BACKGROUND OF INVENTION

1. Field of the Invention

The present invention relates to a method for manufacturing an air permeable composite film. More particularly, the method relates to a method for manufacturing a composite film with superior air and moisture vapor permeability, which is particularly suited for microwave heating.

2. Description of the Prior Art

A wide variety of air and moisture vapor permeable materials have been developed for different purposes. For example, these materials can be used in filtration and separation. In U.S. Pat. No. 5,928,582, for example, there is disclosed a method of forming a microporous membrane that uses a process of ultraviolet irradiation to form microsphereulites, followed by a thermally-induced phase separation, yielding microporous membranes that have improved flow and mechanical properties. In U.S. Pat. No. 5,865,926, Wu et al. disclose a method of making a cloth-like microporous laminate of a non-woven fibrous web and thermoplastic film having air and moisture vapor permeability with liquid-barrier properties.

Other manufacturing processes for production of relevant microporous films are known in U.S. Pat. Nos. 3,378,507; 3,310,505; 3,607,793; 3,812,224; 4,247,498 and 4,466,931. For example, in U.S. Pat. No. 4,350,655, Hoge teaches a process for manufacturing a highly porous thermoplastic film formed by cold drawing a film of a synthetic thermoplastic orientative polymer, such as high-density polyethylene, admixed with a coated inorganic filler. The highly porous thermoplastic film is produced by first casting a film of a blend of the polymer-coated inorganic filler mixture, cooling the film to a temperature of 70° C. and cold stretching the film mono-axially or bi-axially to develop the desired void volume and surface ruptures per unit area, thereby obtaining a resin content (by weight) per cubic centimeter of final product of about 0.18 to about 0.32 gm/cc.

The coated inert inorganic filler and the molten polymer are blended together to form a homogeneous mixture in a suitable mixing extruder. The molten mixture is extruded through a die with an opening from 0.006 inches to 0.010 inches in size. The blend is cold stretched mono-axially or bi-axially, preferably in a station provided with a set of grooved rollers. The groove pattern of the rolls is generally of a sinosoidal wave pattern, wherein the film is stretched in a manner to affect uniform stretching between contact points of the material to produce a material of larger dimension in the stretching direction.

Disadvantageously, however, the manufacturing processes of microporous film products according to the prior art methods are too complicated and too expensive to be generally accepted. Furthermore, many operating factors, such as temperature, stretching ratios, film thickness, starting materials etc., affect the microporous size of the final products, and thus result in variations of the quality of the microporous film products. In addition, the filler added to the microporous film products according to the prior art methods is a source of environmental pollution. Furthermore, most of the film products according to the prior art methods are opaque due to the multiple phases of the film products that result from the addition of fillers.

When food has, heretofore, been cooked at home, the food has been wrapped in a wrapping film for home use, or was packed and sealed in an air or moisture impermeable bag. This is heated in a microwave oven. Moisture contained in the food evaporates, and the bag is thus burst by internal pressure. Moreover, when the film products according to the prior art methods are used to form a food-packaging bag, some of the fillers may contaminate the food within the bag, which results in unpleasant odors. Another disadvantage of the film products according to the prior art methods is that they have poor resistance to alcohol and oil.

SUMMARY OF INVENTION

It is therefore a primary objective of this invention to provide a novel air permeable composite film and manufacturing method thereof to improve the prior art method.

Another objective of the present invention is to provide a novel air permeable composite film with superior oil and alcohol resistance, and strength against stress.

Still another objective of the present invention is to provide a method for making a food packaging bag for microwave heating formed by virtue of the novel air permeable composite films.

In accordance with the present invention, there is provided an air permeable composite film comprising a polymer layer having a top face and a bottom face and a sealing layer that covers the top face of the air permeable composite film. The polymer layer is subjected to an impression process and is perforated to form a plurality of gaps thereon. After performing a thermal process, the molten sealing layer fills the gaps.

In accordance with the processing aspect of the present invention, the air permeable composite film is produced by first providing a polymer layer having a top face and a bottom face, then performing an impression process to perforate the polymer layer so as to form a plurality of gaps on the top face of the polymer layer. Before performing the impression process, a first coating process is performed to form a sealing layer that is used to fill the gaps on the top face of the polymer layer. In another embodiment, the sealing layer is coated after the impression process. The sealing layer keeps the gaps sealed and air impermeable and provides the air permeable composite film with water repelling abilities when the differential pressure between the top face and the bottom face of the air permeable composite film is zero or approximately zero. When the differential pressure grows, the gap, acting as a ventilating perforation, becomes air and vapor permeable.

The sealing layer is made of a material selected from a group consisting of lipids, oleaginous materials, wetting agents, surfactants, waxes, fatty acids and their derivatives, starch, or amyloid materials and their derivatives. The waxes include natural waxes and synthetic waxes. The natural waxes include palm waxes, paraffin waxes, micro-crystalline waxes, beeswax and rice bran waxes. The synthetic waxes include synthetic polyethylene (PE) waxes, synthetic polypropylene (PP) waxes, synthetic polyethylene oxide (PEO) waxes and polyolefin.

In accordance with the present invention, there is provided an air permeable packaging bag comprising a folded polymer layer with three overlapping sealed edges and one open end. The folded polymer layer has a plurality of gaps formed by virtue of an impression process. In order to seal the gaps so as to provide the air permeable packaging bag with water repelling abilities and air impermeability when the internal pressure inside the air permeable packaging bag is small compared to the outside pressure, a sealing layer is formed on the surface of the folded polymer layer. When the internal pressure inside the air permeable packaging bag grows, the gaps, like ventilating perforations, become air and vapor permeable. The open end can be sealed using a zipper, an adhesive tape, an ultrasonic pressing process, or a thermal pressing process so as to form a sealed packaging bag.

As the temperature rises, when the package bag is subjected to a microwave oven, due to the vibration and abrasion of the molecules within the packaged food, the energy of microwave is converted to heat and the temperature and the vapor pressure inside the packaging bag also rises. When the differential pressure between the atmosphere and the inside of the packaging bag increases, the internal vapor pressure causes the packaging bag to inflate, which enlarges the gaps. In addition, the heat causes the sealing material to thin, making it permeable. Under these conditions the gaps become air and vapor permeable. The gaps in the present invention act as a pressure-releasing valve that prevents bursting of the packaging bag.

In accordance with the processing aspect of the present invention, the air permeable packaging bag is manufactured by first providing two polymer layers on which at least one of the two polymer layers comprises a plurality of gaps formed by virtue of an impression process. The two polymer layers are overlapped, and a sealing process seals three of the overlapping edges of the two polymer layers, leaving an opening in the air permeable packaging bag. A sealing layer is formed on the surface of the folded polymer layer. The open end of the bag can be sealed using a zipper, an adhesive, an ultrasonic pressing process, or a thermal pressing process to form a sealed packaging bag.

These and other objectives of the present invention will no doubt become obvious to those of ordinary skill in the art after reading the following detailed description of the preferred embodiment, which is illustrated in the various figures and drawings.

DETAILED DESCRIPTION

Figure 1A:
FIG. 1A to FIG. 1C are cross-sectional diagrams of the structure of an air permeable composite film according to the present invention.
Figure 1B:
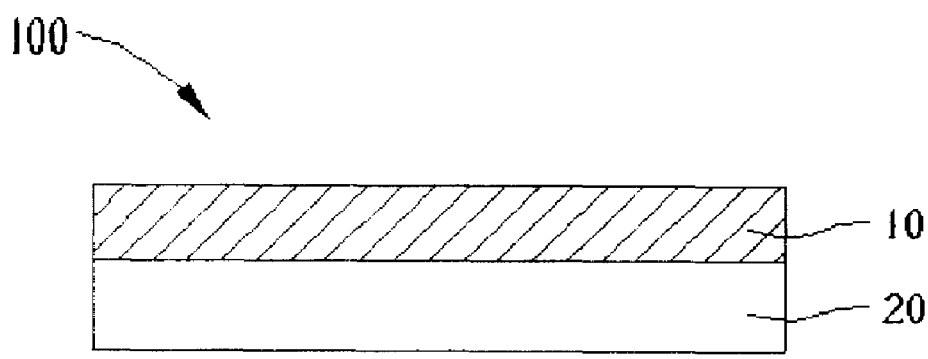
Figure 1C:
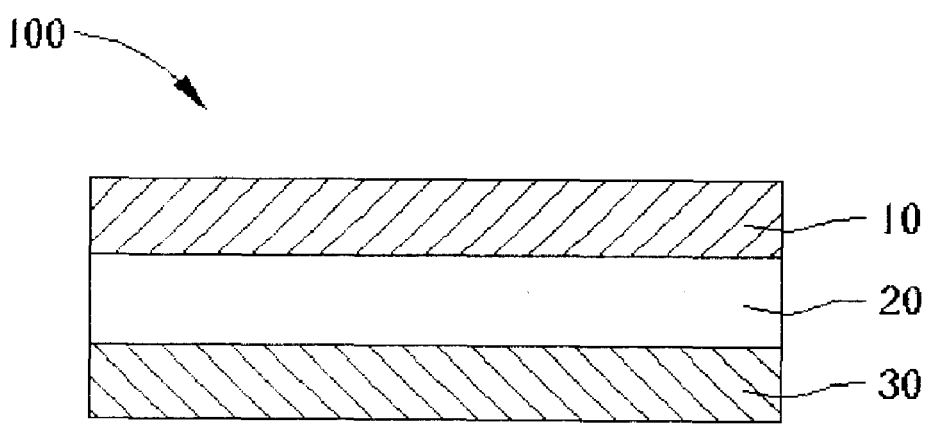

Please refer to FIG. 1A to FIG. 1C. FIG. 1A to FIG. 1C are cross-sectional diagrams of the structures of air permeable composite films before performing an impression process according to the present invention. As shown in FIG. 1A, a structure 100, in this embodiment a polymer composite layer is provided. The structure 100 is made of a material selected from a group comprising acrylic resins, polyester, polyethylene (PE), polypropylene (PP), copolymer of PE and PP, ethylene-styrene copolymer (ES), cyclo olefin, polyethylene terephthalate (PET), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU).

As shown in FIG. 1B, the structure 100 can be a stacked laminate including a first layer 10 and a second layer 20. The first layer 10 is made of a material selected from a group comprising acrylic resins, polyester, polyethylene (PE), polypropylene (PP), copolymer of PE and PP, ethylene-styrene copolymer (ES), cyclo olefin, polyethylene terephthalate (PET), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU). The second layer 20 is made of a material selected from a group comprising acrylic resins, polyester, polyethylene (PE), polypropylene (PP), ethylene-styrene copolymer (ES), cyclo olefin, polyethylene terephthalate (PET), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU), synthetic papers, glassine papers, polyolefin coated paper or paper-like materials. For commercial purposes, the first layer 10 and the second layer 20 are preferably made of transparent materials.

As shown in FIG. 1C, the structure 100 can also be a sandwiched structure comprising a first layer 10, a second layer 20 stacked on the first layer 10, and a third layer 30 stacked on the second layer 20. The first layer 10 is made of a material with a relatively low melting point selected from a group comprising acrylic resins, polyester, polyethylene (PE), polypropylene (PP), copolymer of PE and PP, ethylene-styrene copolymer (ES), cyclo olefin, polyethylene terephthalate (PET), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU). The second layer 20 and the third layer 30 are made of materials selected from a group comprising acrylic resins, polyester, polyethylene (PE), polypropylene (PP), ethylene-styrene copolymer (ES), cyclo olefin, polyethylene terephthalate (PET), polyvinyl alcohol (PVA), ethylene-vinyl acetate (EVA), Surlyn™ (Dupont ionomer), polyethylene naphthalate (PEN), poly ether ether ketone (PEEK), polycarbonate (PC), polysulfone, polyimide (PI), polyacrylonitrile (PAN), styrene acrylonitrile (SAN), or polyurethane (PU), synthetic papers, glassine papers, or paper-like materials.

Figure 2A:
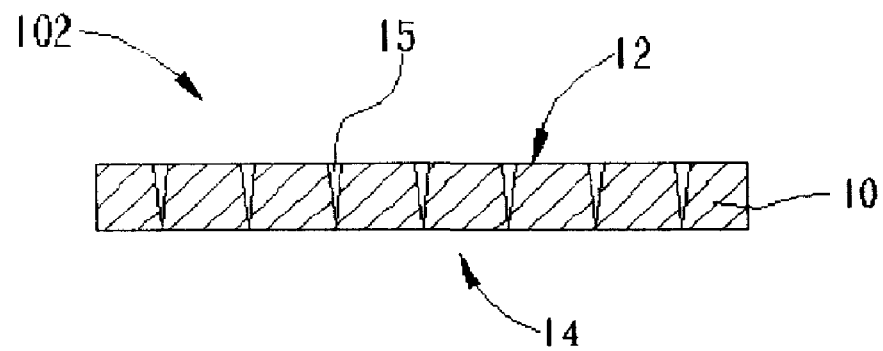
FIG. 2A to FIG. 2C are cross-sectional diagrams of the structure of an air permeable composite film after performing an impression process according to the present invention.
Figure 2B:
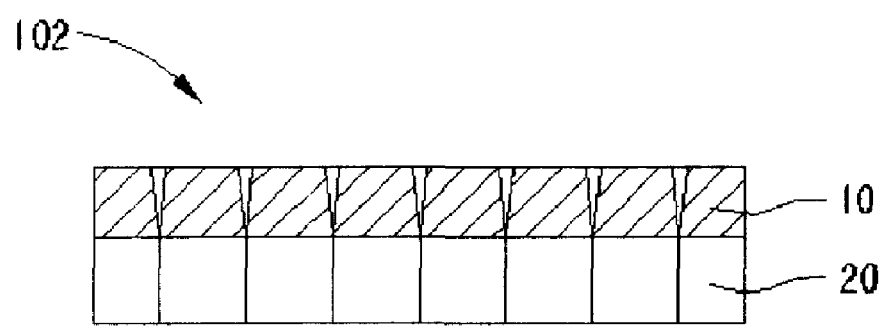
Figure 2C:
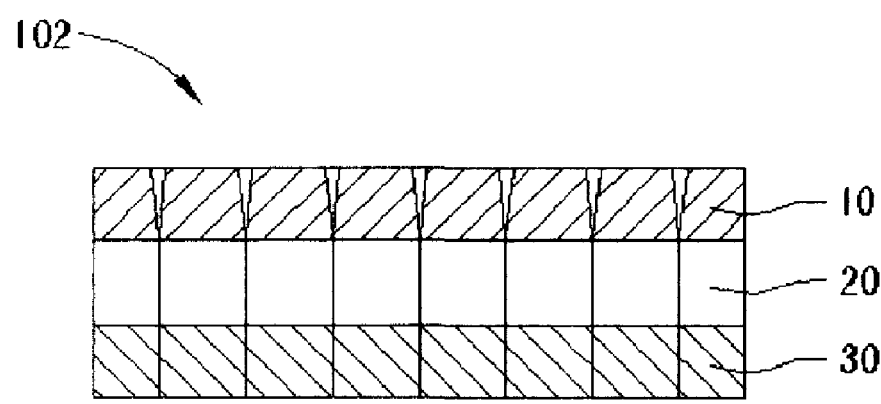

Please refer to FIG. 2A to FIG. 2C, FIG. 2A to FIG. 2C are cross-sectional diagrams of air permeable structures 102 after performing an impression process according to the present invention. These figures are in respective combination with FIG. 1A to FIG. 1C. The structures 100 in FIG. 1A to FIG. 1C are partially or totally perforated by virtue of an impression process in a direction from the top face 12 to the bottom face 14, which forms a plurality of tiny gaps 15 on the structures 102 in FIG. 2A to FIG. 2C. After the impression process, the structures 100 in FIGS. 1A to 1C are permanently damaged, forming the structures 102 in FIGS. 2A to 2C, respectively. As shown in FIG. 2A to FIG. 2C, each of the gaps 15 comprises two edges physically in contact with each other to form a substantially closed gap 15 when a pressure difference between the two sides of the structure 102 is approximately zero. At that time, the gaps 15 are approximately closed (pseudo-closed) and the surface of the structure 102 has a pseudo-planar topography with multiple phases. When the structure 102 swells due to external pressure, the gaps 15 enlarge and become air permeable, and restore again when the external pressure is removed.

The impressed area can be selected as desired to form a random impressed pattern, or the whole area can be impressed. Both continuous-type impression cylinder roller sets and batch-type planar table-like impression machines are suitable for the impression process. The former, however, is more economical, and is more easily automated. The continuous-type impression cylinder assembly comprises an impression cylinder and one opposing cylinder. Both the cylinder roller set and planar table-like machine include an impresser and a transfer co-impresser. At least one of the two impressers comprises a plurality of fine protruding grains on the surface of the cylinder or plate (not shown). The protruding grains may be formed using the following methods: (1) electroplating polyhedron diamond-like powders onto the surface of the impresser; (2) using a laser to engrave ceramic materials or metals formed on the surface of the impresser, such as anilox rolls; (3) using a mechanical tooling method and performing a surface hardening treatment, such as an annealing process, on the metal formed on the surface of the impresser, or plating a hard coating material on the surface of the impresser following a thermal treatment; (4) electrochemically etching and then performing a surface hardening treatment on the surface metal of the impresser. In addition, the opposing cylinder or plate, i.e. the co-impresser, should be made of a metal with a relatively high hardness, such as steel, or ceramic.

Figure 3:
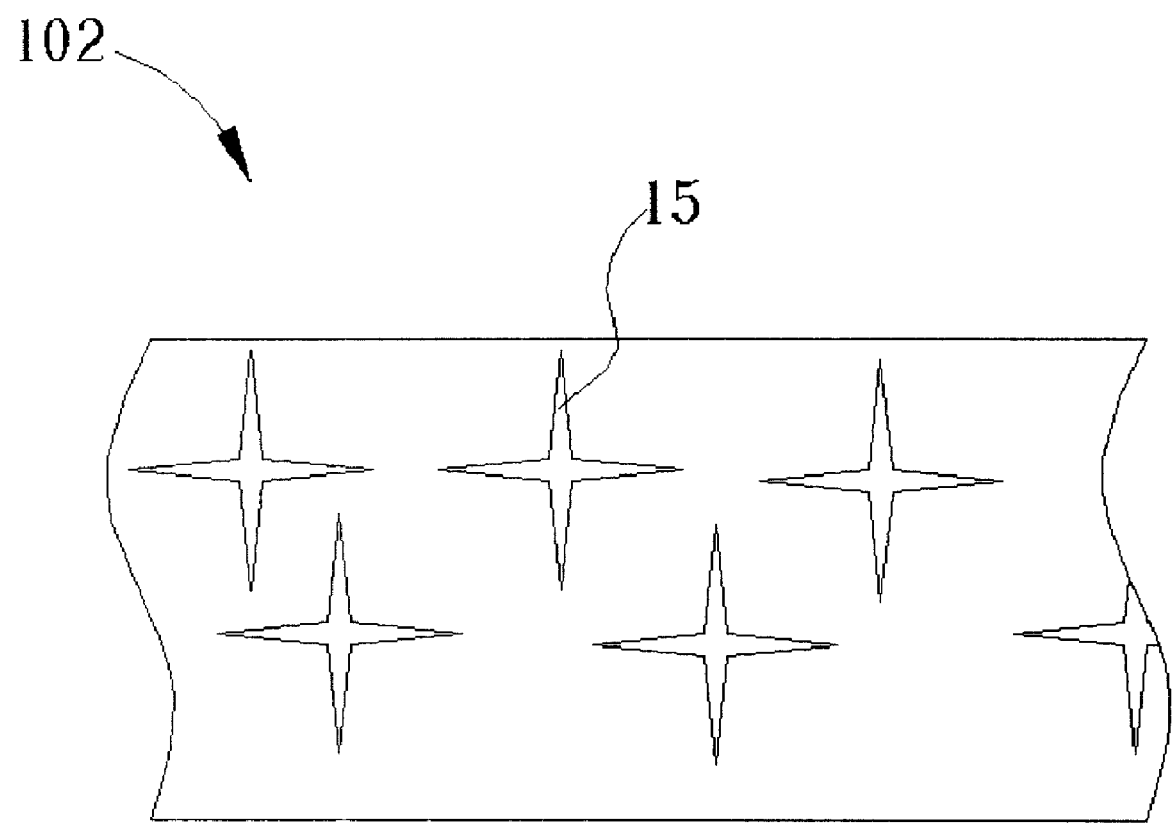
FIG. 3 is a top view of gaps on the surface of an air permeable composite film according to the present invention.

Please refer to FIG. 3. FIG. 3 depicts a top view of the gaps 15, with a cruciform shape, on the surface of the air permeable composite film structure 102 according to the present invention. It should be noted that the gaps 15 may have other shapes. Preferably, the shape of the gaps 15 are selected from groups consisting of linear shapes, conic shapes, pyramidal shapes, tetrahedral shapes, polygonal shapes, or cruciform shapes. Basically, the shape of the gaps 15 depends on the shape of the protruding grains on the surface of the cylinder or plate. The gaps 15 can be evenly distributed, locally distributed, regularly distributed, or irregularly distributed within the selected areas on the surface of the air permeable composite film structure 102, depending on the condition of the cylinders, sealing materials and the function of the air permeable composite film structure 102.

Figure 4:
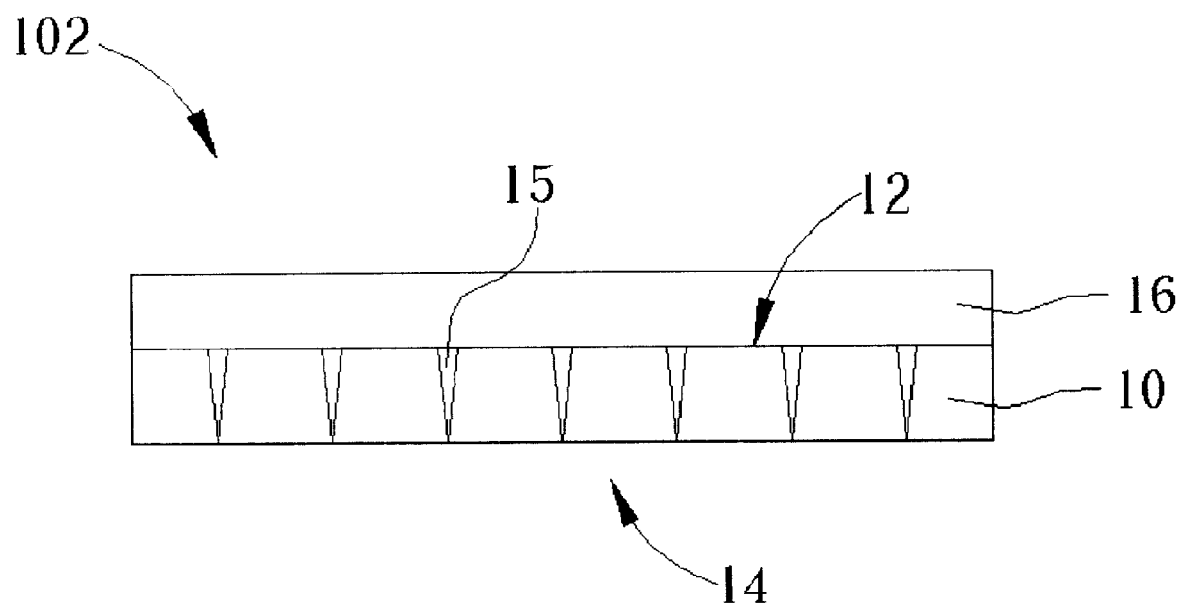
FIG. 4 is a cross-sectional diagram of the structure of an air permeable composite film having a sealing layer on the top face of the air permeable composite film according to the present invention.

Please refer to FIG. 4. FIG. 4 is a cross-sectional diagram of the structure 102 in FIG. 2A with a sealing layer 16 on the top face 12 of the polymer layer 10 according to the present invention. A sealing layer 16 can be optionally coated onto the top face 12 of the polymer layer 10. Similarly, the sealing layer 16 can also be coated onto the polymer layer 10 of FIG. 2B and FIG. 2C. The sealing layer 16 provides the structure 102 with waterproofing abilities, and better thermal insulating properties. The sealing layer 16 keeps the gaps 15 both sealed and air impermeable, and provides the structure 102 with water repelling abilities when the differential pressure between the top face 12 and bottom face 14 is approximately zero. When the differential pressure between the top face 12 and bottom face 14 becomes larger, the gaps 15 become air and vapor permeable. The sealing layer 16 may be coated by a sealing material prepared in an emulsion solution type, dispersion solution type, or a micronized powder type.

Preferably, the sealing layer 16 is made of a material selected from a group comprising lipids, oleaginous materials, wetting agents, surfactants, fatty acids and their derivatives, starch, or amyloid materials and their derivatives, palm waxes, paraffin waxes, micro-crystalline waxes, beeswax, rice bran waxes, synthetic polyethylene (PE) waxes, synthetic polypropylene (PP) waxes, synthetic polyethylene oxide (PEO) waxes and polyolefin. When the composite film structure 102 comes into contact with hot air, the heat of the hot air will degrade the sealing ability of the sealing layer 16, opening the gaps 15, and the hot air can easily permeate through the sealed gaps 15 of the polymer composite layer when the air pressure exerted by the hot air on the first side of the composite film is greater than the air pressure on the other side of the composite film structure 102. On the other hand, when the heating source is removed, the temperature of the composite film structure 102 decreases and the sealing layer 16 regains its sealing abilities. The sealing layer 16 used to fill the gaps 15 can be formed either before or after the impression process.

The method of the present invention further comprises a thermal process that is used to melt the sealing layer 16 so as to improve the sealing of the gaps 15. If the structure 102 is used for food packaging, the sealing layer 16 is preferably an esculent wax certified by the FDA, which is imperceptible during the use of the structure 102, and should not influence the luster, printablility, or sealing of the structure 102. The preferable melting point of the sealing layer 16 is between 40 to 110° C. In the preferred embodiment, Paraffin is used due to its superior water repelling characteristics, and because of its vapor permeability. Moreover, some oxygen scavengers, or oxidizable metal components, such as iron, aluminum, zinc, nickel, copper, manganese, sodium bisulfate, sulfamic acid, ferrous sulfate, zinc sulfate, etc., can be blended into the sealing layer 16 and/or polymer layer 10 to prevent oxidation and putrefaction of food packed using the structure 102.

Figure 5:
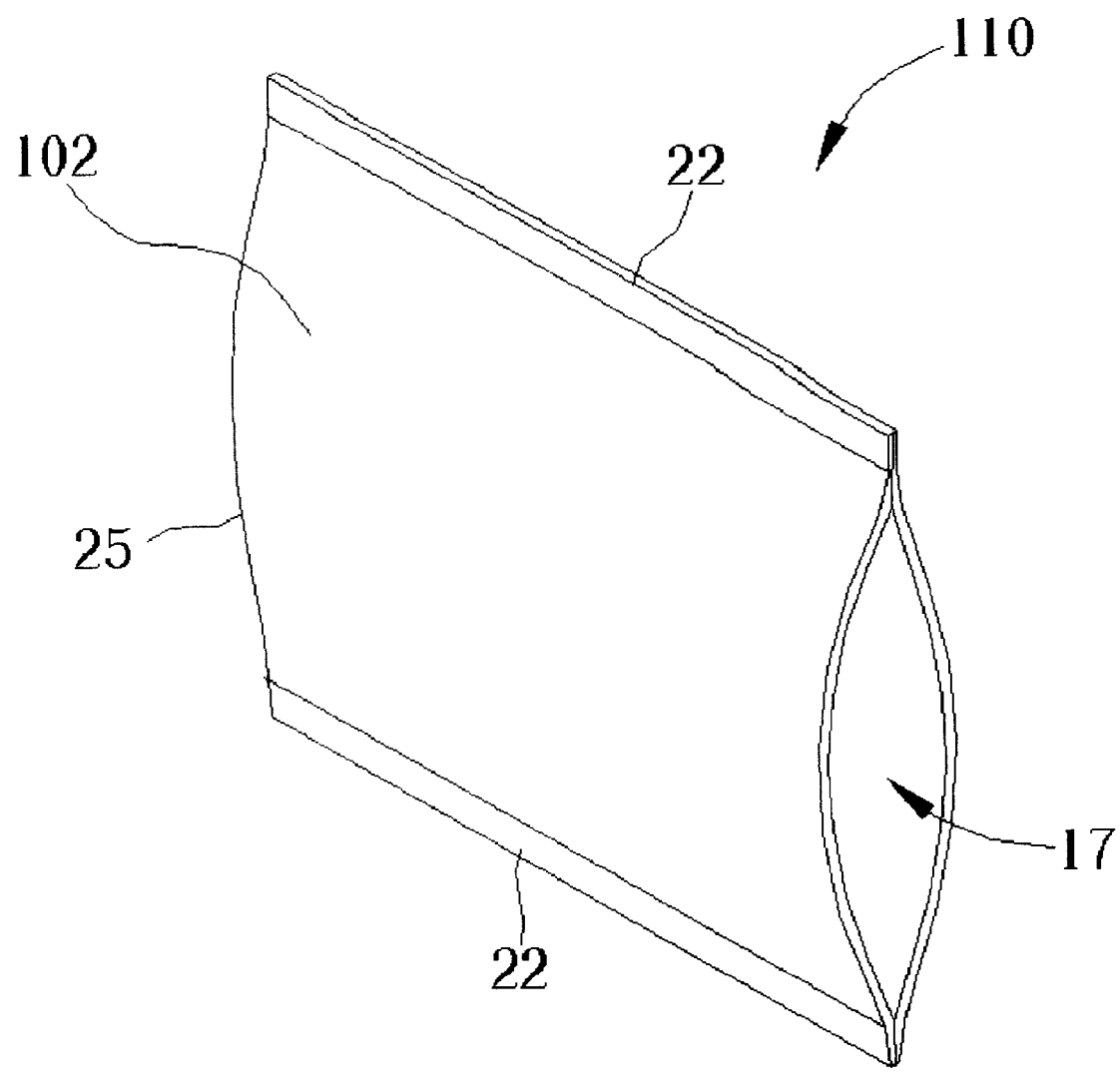
FIG. 5 is a schematic diagram of an air permeable packaging bag made from an air permeable composite film according to the present invention.

Please refer to FIG. 5. FIG. 5 is a schematic diagram of an air permeable packaging bag 110 made of the structure 102 in FIG. 2A to FIG. 2C according to the present invention. It should be noted that the structure 102 of the air permeable packaging bag 110 of the present invention can be made from any of the structures 102 shown in FIG. 2A to FIG. 2C. An air permeable structure 102, either from FIG. 2A, FIG. 2B, or FIG. 2C, is first provided. A sealing material, as earlier mentioned, is coated on the surface of the structure 102 to improve the thermal insulation properties of the air permeable packaging bag 110. But, as noted, such a coating is not essential for this invention. The structure 102 is folded along the middle line 25 to superimpose the folded structure 102 upon itself, the sealing material being coated on the inner surface of the folded structure 102. The two overlapping edges 22 are then sealed so as to form an open end 17. In forming the packaging bag 110 of this invention, by virtue of the usage and application of transparent polymer materials, the printing upon the surface of the packaging bag 110 can be designed to allow a see-through picture of the food that is contained within the packaging bag 110. Thus, consumers can be assured that the product purchased is exactly what they want, and has been processed in a suitable manner.

Figure 6:
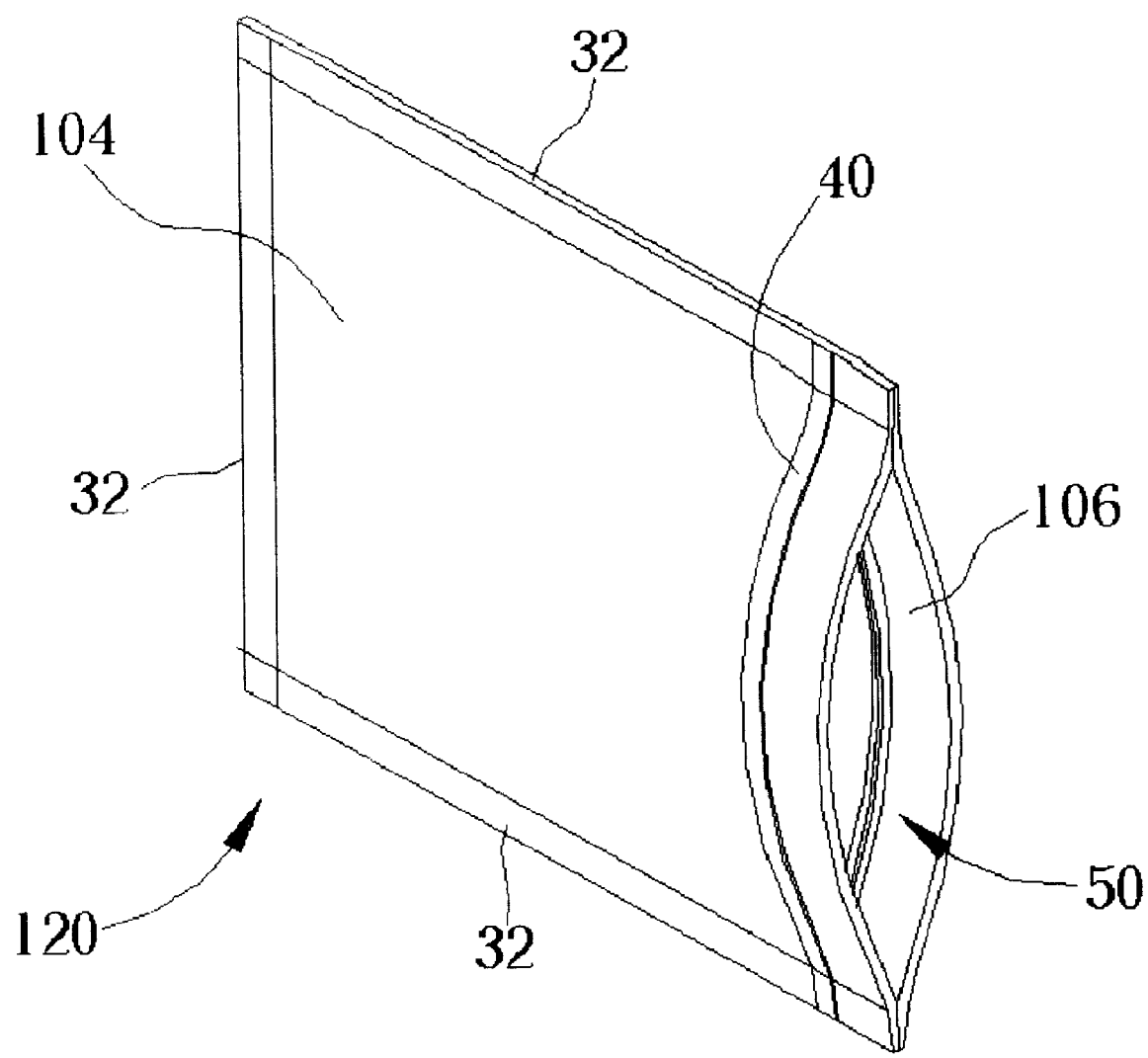
FIG. 6 is a schematic diagram of another embodiment of an air permeable packaging bag made of an air permeable composite film according to the present invention.

Please refer to FIG. 6. FIG. 6 is a schematic diagram of another embodiment of an air permeable packaging bag 120 made of the air permeable composite film according to the present invention. As shown in FIG. 6, the air permeable packaging bag 120 is formed by superimposing a film 104 and a film 106, sealing three of the overlapping edges 32 to leave an open end 50. The three overlapping edges 32 can be sealed using a zipper, an adhesive tape, an ultrasonic pressing process, or a thermal pressing process.

After the food is packed into the packaging bag 120, the open end 50 is sealed using a zipper, sliding zipper, an adhesive, an ultrasonic pressing process, or a thermal pressing process to form a sealed packaging bag 120. As seen in FIG. 6, in this embodiment, a zipper 40 consisting of a groove and a rib on each film 104 and 106 is used to form an interlocking mechanism that can be conveniently opened and re-sealed by consumers. The zipper 40 is easily grasped. When the zipper 40 is pulled, the open end 50 of the packaging bag 120 can be completely opened, and the contents easily removed from the packaging bag 120. It should be noted that the type of adhesive used in the fabrication of this invention should be one that is heat resistant. The manufacturer may wish to use a thermally setting adhesive. Such an adhesive, when initially applied to the packaging bag 120, will maintain adhesion, and will not weaken, fracture, or soften, particularly when exposed to the heat generated by a microwave cooking cycle.

The air permeable packaging bag 120 of the present invention can be used in the packaging of a variety of foodstuffs, such as frozen food products, popcorn, or other substances. The foods packed within the air permeable packaging bag, and which are to be cooked, can be directly heated by means of a microwave oven, steam, boiled water or infrared irradiation. At the beginning of the microwave heating process, the packed food is under a low-temperature condition, and the vapor pressure inside the sealed packaging bag is low. The gaps on the surface of the packaging bag are thus sealed and air impermeable. At this phase, most of the microwave energy is kept in the packaging bag and transferred to a state of heat that provides a uniform heating effect on the food. As the temperature rises, the vapor pressure inside the sealed packaging bag also rises. When the differential pressure between the atmosphere and the inside of the packaging bag increases, the internal vapor pressure inflates the packaging and thus enlarges the gaps. When the temperature reaches the softening point of the sealing material, the sealing layer becomes malleable because of the heat, and the thickness of the sealing layer begins to lessen and/or the gaps may start opening up. That makes the gaps become air and vapor permeable. The gaps in the present invention act as a pressure-releasing valve that prevents the breakage or bursting of the packaging bag due to the buildup of hot air and steam during a microwave heating process.

It is advantageous to use the air permeable packaging bag of the present invention because the final condition of the food can be finely controlled by using different recipes in combination with the number of gaps, shape of the gaps, density of the gaps, distribution of the gaps, film thickness of the packaging bag, starting material of the packaging bag, and the material used in the sealing layer. In addition, cooked food packed in the sealed packaging bag can be frozen or heated repeatedly without impairing the taste of the food, as the structure of the air permeable packaging bag can be restored to its original condition.

One of the main features of the invention is that the packaging bag 120 can be used for comestible articles that are to be cooked in a microwave oven with a uniform cooking result. It also prevents the excessive loss of food constituents, such as water, alcohol, fat, flavor, aromatics and other special components. It provides a means for reducing the criticality of the microwave cooking time, as well as reducing the attention and activity associated with conventional microwave cooking. More particularly, the present invention enables the cooking of frozen foods in microwave ovens without having to initially thaw the food, and/or without having to provide power level changes to sequentially effect thawing and cooking. The packaging bag 120 of this invention can be refrigerated or frozen during the storage of the contained product, and functions very effectively under such conditions. Also, the packaging bag 120 of this invention provides a low-cost, self-identifying microwave-cooking container that may also be used for leftovers and home-frozen foods.

In order to ensure a germ, bacteria and fungus free environment when packaging food and medical clinical articles, food or clinical swabs can be sealed in the packaging bag 120 followed by a high-temperature sterilization, sanitizing and/or ultraviolet radiation treatment. During the sterilization process, the bag inflates and the sealing ability of the sealing material decreases. Hot and high pressure air ventilates through the gaps in the permeable packaging bag. After the sterilization process, the temperature of the packaging bag returns to room temperature. The molten sealing material solidifies and re-seals the gaps while the temperature decreases. The sealing abilities of the sealing material returns. Additionally, the packaging bag will have the appearance of a vacuum-packed bag due to volume contraction at a lower temperature. Therefore, the storage period of germ-free packaged food or clinical products is extended. Therefore, this process is most convenient for cooking fresh meat within the sealed bag and the sealed cooked meat can be frozen and be re-heated with microwave oven directly. Most importantly, the packaging bag 120 can be made almost fully transparent. And as previously explained, the packaging bag 120 is re-usable, and may be used repeatedly for leftovers, for freezing or refrigeration, or for general storage, and subsequent re-heating within a microwave oven.

In addition, the air permeable structure of the invention can be manufactured to form a variety of bags, such as back-sealed bags, gadget bags, three-sided bags or standing pouches. Notably, soups and stews can be packaged using a standing pouch, which is designed to have a pseudo air permeable structure at the top portion of the standing pouch above the level of the soup or stew. When the pouch is cooked in a microwave oven and the soup begins to boil, the hot, high-pressure air ventilates through the opened gaps at the top of the standing bag, and so the bag does not burst.

In another embodiment according to this invention, the air permeable structure 102 can also be used in combination with a microwave tray (not shown) for cooking food. The microwave tray, made of heat resistant materials such as polymeric materials, ceramics, glasses, polyolefin coated paper, wood or bamboo materials, can have spaces with different sizes, and is used to hold the food for cooking. The tray has an open rim on its outer peripheral area. The air permeable structure 102 of the invention is used to seal the microwave tray, covering the food held by the microwave tray. The open rim of the microwave tray is snugly sealed using methods mentioned earlier, such as a thermal pressing method, or by using a rim secure socket, a ziplock, sliding zipper, a heat sealing process, an ultrasonic pressing process or an adhesive. Browning, crisping, or singeing, can be achieved by coating and/or blending a unique heat or temperature enhancing material, such as carbon black or metallic powder, within selected areas of the microwave tray. Such materials are capable of converting more microwave energy to heat within those selected areas, creating higher temperatures.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of manufacturing an air permeable packaging bag, the method comprising the steps of:
   providing a first polymer film and a second polymer film, at least the first polymer film having a plurality of gaps extending through the first polymer film and being formed therein by virtue of an impression process, the gaps being configured to restrict air permeation through the first polymer film in a static state;
   overlapping the first and second polymer films; and
   performing a sealing process to seal the overlapping edges of the first and second polymer films to define an open interior and an opening for the air permeable packaging bag,
   wherein when the air pressure within the open interior of the packaging bag is greater than the air pressure outside of the open interior, the plurality of gaps gradually deform and open to permit the air within the open interior of the packaging bag to permeate through the first polymer film, the plurality of gaps being configured to return to the static state to restrict air permeation through the first polymer film when the air pressure outside of the packaging bag is substantially equal to or greater than the air pressure within the open interior such that the packaging bag can be reused to regulate another increase of pressure within the open interior of the packaging bag.

2. The method of claim 1 wherein the method further comprises a step of applying sealing material on a first surface of the first polymer film.

3. The method of claim 2 wherein the sealing material is applied after the impression process, and the sealing material applied on the first polymer film fills the gaps of the first polymer film to restrict air permeation in the static state,
   wherein upon the application of heat, the sealing material softens and permits the opening of the gaps in the first polymer film to allow air permeation through the first polymer film.

4. The method of claim 2 wherein the sealing material is applied before the impression process, and the method further comprises a thermal process to soften the sealing material after the impression process, so that the sealing material can fill the gaps in the first polymer film to prevent air permeation.

5. The method of claim 2 further comprising a second coating process to apply a second sealing material on a second surface of the first polymer film.

6. The method of claim 1 wherein the first and second polymer films comprise one or more layers each made by one of the following materials: acrylic resins, polyester, polyethylene (PE), polypropylene (PP), copolymer of PE and PP, ethylene-styrene copolymer (ES), cyclo olefin, polyethylene terephthalate (PET), polyvinyl alcohol (PVA), ethylene-vinyl acetate (EVA), ethylene/methacrylic acid (E/MAA) ionomer, polyethylene naphthalate (PEN), poly ether ether ketone (PEEK), polycarbonate (PC), polysulfone, polyimide (PI), polyacrylonitrile (PAN), styrene acrylonitrile (SAN), polyurethane (PU), synthetic papers, gassine papers, or polyolefin coated paper.

7. The method of claim 1 wherein at least two overlapping edges are sealed in the sealing process so as to form the opening in the air permeable packaging bag.

8. The method of claim 1 wherein at least one curving edge is sealed in the sealing process as to form the opening in the air permeable packaging bag.

9. The method of claim 1 wherein the sealing process is performed using a heat activating process, an ultrasonic pressing process, or an adhesive.

10. The method of claim 1 wherein the method further includes a step of closing the opening of the air permeable packaging bag by using a zipper, a ziploc, a sliding zipper, a heat activating process, an ultrasonic pressing process, or an adhesive.

* * * * *